Patented Jan. 8, 1952

2,581,335

UNITED STATES PATENT OFFICE 2,581,335

WATER - TOLERANT, HEAT - CONVERTIBLE, HEAT- AND STEAM-SETTING RESINS FOR USE IN INKS

Kenneth A. Earhart, Baltimore, Md., and Arthur L. Davis, Hastings on Hudson, N. Y., assignors, by mesne assignments, to National Distillers Products Corporation, New York, N. Y., a corporation of Virginia No Drawing. Application May 26, 1949, Serial No. 95,584

9 Claims. (Cl. 260—26)

This invention relates to a method for the preparation of a water-tolerant, heat-convertible composition of matter which may be employed in the manufacture of printing inks and for the coating of textiles and the like.

In general, the method is carried out by heating an alkali metal salt of a Diels-Alder addition product of rosin and fumaric acid, maleic acid or maleic anhydride, or a mixture thereof, together with glycerol alpha-monochlorohydrin ($CH_2Cl$—$CHOH$—$CH_2OH$) in solution in a monohydric alcohol, glycol or polyglycol, or a mixture of such solvents.

As the heating is carried out, there is for a time a progressive increase in the water-tolerance of the mixture until a maximum is reached, after which the water-tolerance decreases. The method is valuable for the preparation of resins having predetermined water-tolerance which may vary over a considerable range.

Having thus indicated the general nature and purpose of the present invention, the following examples, which are intended to be not limitative, are included to illustrate specific embodiments thereof.

EXAMPLE I

A Diels-Alder addition product of rosin and fumaric acid was prepared by adding 250 parts of fumaric acid to 1000 parts of molten wood rosin and then heating the mixture to 400° F. The product was a reddish-orange solid of approximately 274 acid number and had a melting point of about 145° C. by the mercury method. The addition product was soluble in diethylene glycol, the water-tolerance of a 50% by weight solution being considerably below 100%, based upon the weight of the solution, i. e., less than one part of water could be admixed with one part of the solution without precipitating the resin.

Two hundred grams of the addition product prepared as described in the preceding paragraph was dissolved in 290 grams of hot diethylene glycol. To this solution, when cooled somewhat, was added an amount of potassium hydroxide pellets exactly equivalent to the acid number of the resin (54.8 grams). After replacing any of the glycol that had been lost by evaporation, the now neutral solution was cooled to room temperature, and glycerol alpha-monochlorohydrin was added in amount equivalent to the amount of caustic employed (110 grams). The resulting homogeneous solution was thereafter heated to a maximum of 146–147° C., at which point the salt, which had been deposited, was removed by filtration under reduced pressure. The salt, when washed and dried, weighed 70.5 grams (97% of theoretical). The cooled filtrate, which was composed of a 50% solution in diethylene glycol of the reaction product of the salt of the addition product and glycerol alpha-monochlorohydrin, was titrated with water in order to determine the water-tolerance. The point at which the solution became opaque was accepted as the end point. In this particular case, the water-tolerance of the solution was found to be 775%, but when heated further, the water-tolerance of the solution decreased.

When reaction temperatures above 147° C. were used, the water-tolerance of the 50% solution was found to fall off quite rapidly, until at about 168° C. the tolerance of the solution was found to be about that of the original solution of the addition product in diethylene glycol, i. e., less than 100%. In a corresponding manner, values of less than 775% water-tolerance were obtained when the solution was heated to a point below 147° C. The following table contains the results of these tests.

*Table I*

| Temperature, °C. | Per cent water-tolerance based on total solution |
|---|---|
| 25 | 90 |
| 99 | 110 |
| 120 | 140 |
| 132 | 475 |
| 143 | 775 |
| 144 | 775 |
| 148 | 760 |
| 150 | 760 |
| 155 | 750 |
| 161 | 450 |
| 165 | 90 |

During the course of the experiments, the results of which are shown in the preceding table, the temperature recorded was the maximum temperature which the system had attained. The solution was heated to the temperature shown in the table, and immediately removed from the source of heat, so that gradual cooling could take place.

It was also found that prolonged heating at a particular temperature served the same purpose as did heating to a somewhat higher temperature followed by immediate reduction of the temperature. As determined by the water-tolerance data for various times of prolonged heating at a relatively constant temperature, the water-tolerance curve follows along the same general course as the one obtained from successively increasing temperatures. The results of these experiments are shown in the following table.

*Table IA*

| Temperature, °C. | Per cent water-tolerance, based on total solution | Heating time |
|---|---|---|
| 148 | 1175 | 2-3 seconds. |
| 148 | 1200 | 30 seconds. |
| 148-150 | 685 | 1 minute. |
| 148-151 | 480 | 2 minutes. |
| 148-151 | 190 | 3 minutes. |
| 150-152 | 60 | 10 minutes. |
| 151-153 | 48 | 20 minutes. |
| 151-155 | 45 | 1 hour. |

Thus, there are two ways of arriving at a predetermined water-tolerance, namely, heating to a maximum temperature followed by cooling, and heating at a somewhat lower temperature for a period of time.

When propylene glycol was substituted for diethylene glycol in the preceding procedure, there were obtained the following results, which are comparable to those of Table I:

*Table IB*

| Temperature, °C. | Per cent water-tolerance based on total solution |
|---|---|
| 24 | 100 |
| 102 | 100 |
| 125 | 125 |
| 135 | 175 |
| 139 | 205 |
| 142 | 250 |
| 149 | 375 |
| 155 | 600 |
| 163.5 | 590 |
| 166 | 585 |
| 171 | 515 |

Likewise, when dipropylene glycol was used as a solvent in the preceding procedure, there were obtained the following results, which are comparable to those shown in Table I:

*Table IC*

| Temperature, °C. | Per cent water-tolerance based on total solution |
|---|---|
| 24 | 125 |
| 103 | 135 |
| 128 | 155 |
| 136 | 215 |
| 144 | 300 |
| 150 | 400 |
| 159 | 415 |
| 168 | 360 |
| 174 | 280 |
| 188 | 160 |

EXAMPLE II

In this example, the general procedure of Example I was followed, but in this instance using potassium hydroxide and glycerol alpha-monochlorohydrin in amount only two-thirds equivalent to the amount of addition product, based upon the acid number thereof. The following amounts of reactants were used:

|  | Grams |
|---|---|
| Diels-Alder addition product | 100 |
| Diethylene glycol | 130.6 |
| Potassium hydroxide | 18.4 |
| Glycerol alpha-monochlorohydrin | 36.8 |

The effect of temperature upon the water-tolerance is shown by the data of the following table:

*Table II*

| Temperature, °C. | Per cent water-tolerance based on total solution |
|---|---|
| 24 | 60 |
| 122 | 75 |
| 131 | 100 |
| 142 | 150 |
| 146 | 185 |
| 151 | 230 |
| 158 | 250 |
| 165 | 235 |
| 171 | 135 |

In practicing the method of the present invention, it is essential, in order to obtain a significant rise and fall in water-tolerance, that the amount of potassium or other alkali metal base and glycerol alpha-monochlorohydrin used be equivalent to at least one-half the amount of addition product taken, based upon its acid number. Thus, when only one-third the equivalent amounts of potassium or other alkali metal base and glycerol alpha-monochlorohydrin are used, the variation of water-tolerance with respect to temperature is as follows:

*Table III*

| Temperature, °C. | Per cent water-tolerance based on total solution |
|---|---|
| 24 | 55 |
| 123 | 60 |
| 131 | 60 |
| 143 | 65 |
| 146 | 65 |
| 152 | 50 |
| 158 | 40 |
| 165 | 30 |
| 173 | 30 |

In obtaining the data of the immediately preceding table, the following reactants were used:

|  | Grams |
|---|---|
| Diels-Alder addition product | 100 |
| Diethylene glycol | 115 |
| Potassium hydroxide | 9.2 |
| Glycerol alpha-monochlorohydrin | 18.4 |

Various modifications may be made in the specific procedures described in accordance with the method of the present invention. For example, in place of the fumaric acid addition product there may be used the addition product of rosin and maleic acid, the addition product of rosin and maleic anhydride, or a mixture of the addition products of rosin and maleic and fumaric acids and maleic anhydride. In general the addition product is prepared from 0.86 to 3.37 gram moles of fumaric acid or equivalent per 1000 grams of rosin, and preferably from 1.7 to 2.6 gram moles of fumaric acid or equivalent. Also, in place of the potassium salt reacted with the glycerol alpha-monochlorohydrin there may be employed other alkali metal salts, such as the sodium salt, or mixtures of the salts of various alkali metals prepared, for example, using sodium hydroxide, potassium oxide, sodium oxide, etc. As was stated above, the amount of potassium hydroxide or equivalent taken should be equivalent to at least one-half (preferably at least two-thirds) of the addition product used, based upon the acid number of the addition product, and the chlorine content of the alpha-chlorglycerol should be substantially equivalent to the alkali metal content of the neutralized or partially neutralized addition product.

Furthermore, in place of the diethylene glycol, propylene glycol, and dipropylene glycol used in the examples as a solvent, there may be substituted a saturated aliphatic monohydric alcohol (e. g., methanol, ethanol, n-propanol, i-propanol or tert.-butanol), a glycol (e. g., ethylene glycol, trimethylene glycol or 1,3-butylene glycol), or a polyglycol (e. g., triethylene glycol), or a mixture of such solvents. The solvent or mixture of solvents used should be completely miscible with water at room temperature. The upper limit of concentration of the resin-forming ingredients in the reaction mixture is determined by the ease with which the glycerol alpha-monochlorohydrin may be introduced into it and also by the ease with which thhe precipitated salt, such as potassium chloride, may be removed from it. On the other hand, the lower limit of concentration of the resin-forming ingredients is determined by the extent to which the salt, such as potassium chloride, tends to remain dissolved in the reaction mixture. In general, therefore, the reaction mixture should preferably contain from about 0.2 to about 2.5 parts of partially or completely neutralized addition product per part of solvent on a weight basis.

As the examples illustrate, the temperature to which the reaction mixture is heated and the length of the heating time may be varied considerably, depending upon the water-tolerance desired in the final product, with reaction temperatures of at least 100° C. and preferably of 120–160° C. being preferred.

The compositions which may be prepared by the process described are especially well adapted to use in the textile and graphic arts industries. For example they are excellent grinding vehicles for pigments and have excellent dispersing properties.

When used in the preparation of inks they result in products which have a definite tolerance for moisture or water but may be set or made insoluble by the addition of water beyond the tolerance limit established by their mode of preparation. They may also be set by heat alone. It is thus seen that they are particularly adapted for use in the preparation of water-tolerant steam- or heat-setting inks and as such may be set or hardened by means well known in the printing art. The fact that they may be prepared so as to have a considerable water-tolerance makes them especially useful in the preparation of inks for use under conditions of high relative humidity, a condition under which present inks are far from satisfactory and at times actually non-usable.

If resins of sufficiently high initial water-tolerance are selected they may, for example, be applied to textiles which are subsequently passed through aqueous baths without premature setting.

It is possible by the disclosed process to prepare resins of a given water-tolerance but of widely different acid numbers.

We claim:

1. A method as in claim 6, in which the alkali metal base is potassium hydroxide.

2. A method as in claim 6, in which said material is fumaric acid.

3. A method as in claim 6, in which said salt is prepared by neutralizing said addition product with at least two-thirds the equivalent amount of alkali metal base, based upon the acid number of said addition product.

4. A method as in claim 6, in which the alkali metal base is potassium hydroxide and in which said material is fumaric acid.

5. A method as in claim 6, in which the alkali metal base is potassium hydroxide, said material is fumaric acid and said salt is prepared by neutralizing said addition product with at least two-thirds the equivalent amount of alkali metal base, based upon the acid number of said addition product.

6. The method for the preparation of a water-tolerant, heat-convertible composition of matter which comprises heating glycerol alpha-monochlorohydrin and an alkali metal salt of a Diels-Alder addition product of rosin and at least one material selected from the group consisting of fumaric acid, maleic acid and maleic anhydride, at a temperature within the range of 120°–160° C., the said salt being prepared by neutralizing said addition product with at least one-half the equivalent amount of alkali metal base, based on the acid number of said addition product, the glycerol alpha-monochlorohydrin being used in an amount equivalent to the alkali metal base, the heating being effected with the reactants in solution in at least one solvent selected from the group consisting of saturated aliphatic monohydric alcohols and glycols, said solvent being completely miscible with water at room temperature.

7. A method as in claim 5 in which propylene glycol is used as the solvent.

8. A method as in claim 5 in which diethylene glycol is used as the solvent.

9. A method as in claim 5 in which dipropylene glycol is used as the solvent.

KENNETH A. EARHART.
ARTHUR L. DAVIS.

REFERENCES CITED

The following references are of record in the file of this patent:

UNITED STATES PATENTS

| Number | Name | Date |
|---|---|---|
| 2,039,243 | Krzikalla et al. | Apr. 28, 1936 |
| 2,437,046 | Rothrock et al. | Mar. 2, 1948 |

OTHER REFERENCES

Carothers: Collected Papers pub. by Interscience Publishers Inc., New York (1940), pages 24–26.